July 21, 1970            J. GRAYZEL            3,521,166
WIDE BAND MEASURING AND RECORDING METHODS AND APPARATUS
Filed Feb. 1, 1967
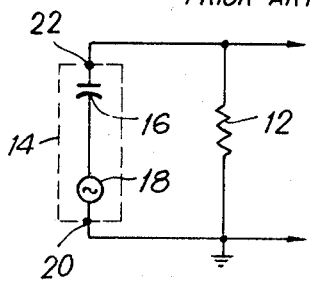
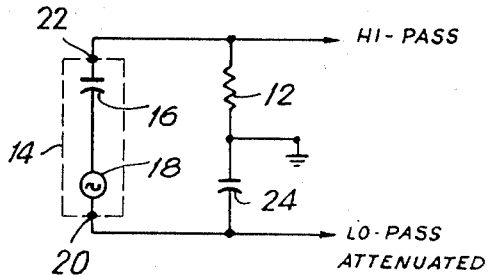
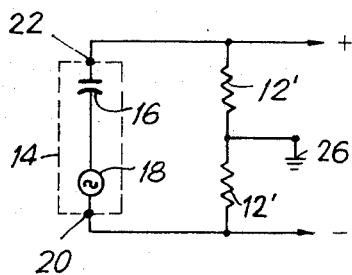
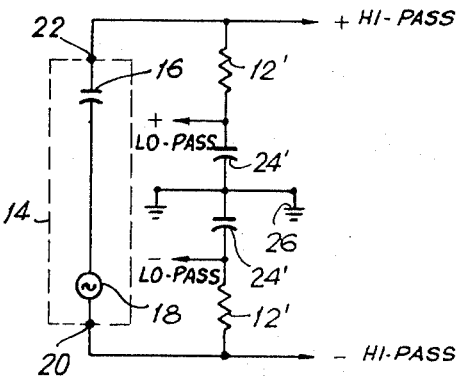
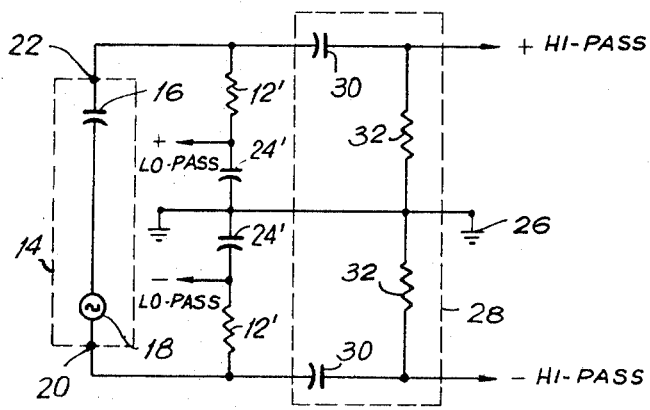
INVENTOR.
JOSEPH GRAYZEL
BY
*Zackenbach & Siegel*
ATTORNEYS

United States Patent Office 3,521,166
Patented July 21, 1970

3,521,166
WIDE BAND MEASURING AND RECORDING METHODS AND APPARATUS
Joseph Grayzel, Palisades Park, N.J., assignor to Electro-Catheter Corporation, Rahway, N.J., a corporation of New Jersey
Filed Feb. 1, 1967, Ser. No. 614,770
Int. Cl. G01m 7/00; G01r 29/22
U.S. Cl. 324—128                    3 Claims

ABSTRACT OF THE DISCLOSURE

Method and apparatus are disclosed which enable the measurement and recording at low impedance of both low-frequency and high-frequency components, separately and simultaneously, of a signal generated by a piezo-electric crystal or other device possessing a small internal capacitance, and further, for enabling the respective low levels of impedance for low-frequency and high-frequency bands to be different and independently prescribed.

---

This invention relates generally to measuring and recording methods and apparatus, and more particularly to methods and apparatus for enabling simultaneous measurement at low impedances of high and low frequency components of a signal generated by piezo-electric crystals.

Piezo-electric crystals are widely used to detect mechanical vibrations or pressure waves, particularly sonic and ultrasonic waves. When a pressure wave impinges upon the polarized crystal the structure is stressed and a charge $Q_c$ develops across the piezo-electric crystal. Since the crystal has the property of electrical capacitance, $C_1$, the developed charge produces a voltage $V_c$ between opposite metallized surfaces of the crystal according to the relation $Q_c = C_1 V_c$.

The detection of pressure waves is accomplished by measuring either the charge, $Q_c$, or the related voltage, $V_c$, produced across the crystal. This is done with either a "charge amplifier" (i.e., extremely high-impedance electrometer amplifier with negative-capacitance feedback) or with a voltage amplifier, respectively. Voltage amplification is by far the more commonly used method, because of lower equipment costs, simpler operation and higher reliability.

In systems measuring the voltage, $V_c$, produced across the crystal, the simple electrical equivalent representation of the stressed piezo-electric crystal is that of a voltage generator with series capacitance, $C_1$. This capacitance together with an attached load resistance, $R_L$, such as the input resistance of a voltage amplifier, determines a time-constant, $R_L C_1$, and hence a low-frequency cut-off point, $f_1$. The low frequency cut-off point, $f_1$, is the 3 db point, calculated as $f_1 = 1/(2\pi R_L C_1)$. As frequency decreases below this low frequency cut-off point, $f_1$, the harmonic content of the crystal's voltage is less available to the amplifier, with an attenuation of 6 db per octave. Thus, for a given crystal capacitance, $C_1$, the recording of lower frequencies require proportionately higher values of the load resistance, $R_L$, to make the time-constant, $R_L C_1$, longer. Since for real crystals the equivalent series capacitance, $C_1$, is often very small, the load resistance, $R_L$, must be very large if low frequencies are to be recorded. However, increasing the load resistance, and hence the input resistance of the amplifier into the range of many megohms requires special and generally more expensive amplifier circuitry, such as an electrometer input. Also, these high impedance levels are associated with proportionately greater noise, which may yield an intolerable signal/noise ratio or even prevent recognition of certain components of the signal.

The problem of noise at high impedance levels is made very acute if the pressure waves impinging upon the piezo-electric pick-up have much greater power in their low-frequency components than in the higher frequency components. This situation frequently exists with natural phenomena, such as shock or pulse waves, and also pressure-sound waves within the mammalian cardio-vascular system. In such a situation the large power of the low-frequency components will limit the amount of amplification possible with a given amplifier short of oversaturation. But this gain may be insufficient to permit recognition and recording of the high-frequency content of the voltage signal, $C_c(t)$, produced by the piezo-electric crystal.

In summary, the limitation inherent in measuring piezo-electric voltages lies in the very high-impedance levels required for low-frequency response, a requirement which is particularly severe when low-frequency components have the predominant power but the entire signal bandwidth is of interest.

Accordingly, it is a primary object of the present invention to provide methods and apparatus for enabling measurement and recording of low-frequency pressure waves utilizing a piezo-electric crystal, at the same time that the remaining high-frequencies are also being measured or recorded.

Another primary object of the present invention, in addition to the foregoing object, is to provide methods and apparatus for enabling measurement and recording of low-frequency pressure waves utilizing a high-gain, low-impedance amplifier.

A further primary object of the present invention, in addition to the foregoing objects, is to provide methods and apparatus for enabling measurement and recording of low-frequency pressure waves utilizing a piezo-electric crystal without substantial noise.

Still another primary object of the present invention, in addition to the foregoing objects, is to provide methods and apparatus for measuring and recording pressure waves having both low and high frequency components.

Yet another primary object of the present invention, in addition to the foregoing objects, is to provide methods and apparatus of measuring and recording pressure waves wherein the low frequency components have the predominant power but the entire signal bandwidth is of interest.

Another and yet still further primary object of the present invention, in addition to the foregoing objects, is to provide methods and apparatus enabling measurement and recording at low impedance of both low frequency and high frequency components, separately and simultaneously, of a signal generated by a piezo-electric crystal or other device possessing a small internal capacitance, and further, for enabling the respective low levels of impedance for low-frequency and high-frequency bands to be different and independently prescribed.

It is a feature of the present invention that it enables measurement and recording of the voltage across any small capacitor or capacitive device at a lower impedance level than would be required if the measurement were made directly upon the small capacitor or capacitive device.

Another feature of the present invention is that it enables low-frequency and high-frequency voltage components appearing across a small capacitor or capacitive device to be measured and recorded separately and simultaneously.

In the drawing:

FIG. 1 is a schematic illustration of a conventional single-ended, unbalanced circuit for measuring the voltage developed across a piezo-electric crystal;

FIG. 2 is a schematic illustration of an improved single-ended, unbalanced circuit in accordance with the principles of the present invention for measuring the voltage developed across a piezo-electric crystal;

FIG. 3 is a schematic illustration of a conventional double-ended, balanced circuit for measuring the voltage developed across a piezo-electric crystal;

FIG. 4 is a schematic illustration of an improved double-ended, balanced circuit in accordance with the principles of the present invention, for measuring the voltage developed across a piezo-electric crystal; and FIG. 5 is a schematic illustration of another improved circuit in accordance with the principles of the present invention for measuring the voltage developed across a piezo-electric crystal.

Like reference characters are utilized in the several figures for like components.

The improved method and apparatus of the present invention effects a substantial reduction in the impedance level at which the complete spectrum of the voltage vs. time waveform generated by the stressed piezo-electric crystal is recorded. This first aspect of the invention is based upon a property of series capacitors, namely, when two capacitors are in series the voltage across the pair is divided between the two in proportion to their impedence, i.e., inversely proportional to their capacitance. Thus, if a large external capacitor of capacitance $C_e$ is placed in series with a piezo-electric crystal of capacitance $C_i$, and, for example, $C_e = 100 C_i$, the voltage $V_e$ across the external capacitor of capacitance $C_e$ is at every instant only 1% of the voltage generated by the crystal. However, the impedance of the external capacitor of capacitance $C_e$ is only 1/100 that of the piezo-electric crystal of capacitance $C_i$. Thus, for measurements of the voltage across the external capacitor of capacitance $C_e$ rather than across the crystal, there is a reduction in impedance level proportional to the reduction in signal strength. Since it is better in many respects (e.g. cost, simplicity, noise levels) to employ amplifiers with high-gain rather than high impedance, measuring the voltage $V_e$ across the external capacitor having a capacitance $C_e$ rather than the voltage across the piezo-electric crystal itself has merit, if the signal voltage, $V_c$, generated by the crystal can stand attenuation, because the required input impedance of the recording amplifier is substantially lower for measurement of the voltage $V_e$ across the external capacitor as opposed to the signal voltage $V_c$ of the piezo-electric crystal.

A second feature of the invention permits the signal bandwidth to be divided in two, and these two portions of the signal bandwidth to be separately recorded at different impedance levels. In *theory*, whenever a load resistor of resistance $R_L$ is placed across a piezo-electric crystal, frequency components above the 3 db cut-off point of frequency $f_1$, appear across the load resistor of resistance $R_L$, which provides the high-pass, and the crystal's internal capacitance $C_i$ provides the low-pass. In practice, the voltage across the load resistor of resistance $R_L$, which in reality may be the input resistance of the amplifier, is readily measured and recorded. However, the low-frequency harmonics of the voltage waveform $V_c(t)$ appearing across the crystal's internal capacitance $C_i$ are *not* available because the two terminals of this "equivalent capacitor" of capacitance $C_i$ are not available. Only the two electrodes plated on the piezo-electric crystal are available, and included between these electrodes are both the "equivalent capacitor" of capacitance $C_i$ and the equivalent voltage generator (see FIG. 1). If, however, into the series circuit comprising the piezoelectric crystal and the load resistance of resistance $R_L$, as shown in FIG. 1, an external capacitor of capacitance $C_e$ is introduced, as shown in FIG. 2, the voltage $V_e$ across the external capacitor of capacitance $C_e$ provides the low-pass filter with the low-frequency components of the signal of voltage $V_c$ being attenuated according to the relation $$V_e(t) = (C_i/C_e) V_c(t)$$

as was previously explained.

With reference now to the drawing, the conventional single-ended, balanced circuit of FIG. 1 comprises a load-resistor 12 connected with a piezo-electric crystal 14. As illustrated, the piezo-electric crystal 14 is electrically equivalent to a capacitor 16 in series with a signal or voltage source or generator 18.

The terminals indicated as 20 and 22 represent the electrodes on the piezo-electric crystal 14. The cut-off frequency, $f_1 = 1/(2\pi R_L C_i)$. Frequencies above the frequency $f_1$ appear across the load resistor 12. Frequencies below the frequency $f_1$ are not available since one cannot measure the voltage across the equivalent capacitor 16 alone, but measurements can only be made across the terminals 20 and 22. Since the terminals 20 and 22 are electrically identical to the terminals of the load resistor 12, the voltage waveform across the crystal's terminals 20 and 22 is identical to that across the load resistor 12, and contains only the frequencies above the cut-off frequency $f_1$.

The circuit of FIG. 2 is similar to that shown in FIG. 1, but with the addition of a series capacitor 24 of capacitance $C_e$. If the capacitance $C_e$ of the series or external capacitor 24 is much larger than the capacitance $C_i$ of the crystal 14, the net series capacitance is negligibly altered and is essentially equal to the capacitance $C_i$ of the piezo-electric crystal 14 alone. In other words, $C_i \cong (C_i C_e)/(C_i + C_e)$ for $C_e \gg C_i$. Thus, the same value of load resistance $R_L$, supplied by the load resistor 12 can be employed to provide the same value for the frequency $f_1$, and the frequencies above frequency $f_1$ appear across the load resistor 12, as in the circuit of FIG. 1. However, in addition, the low-frequency signals appear across the external capacitor 24 of capacitance $C_e$, whose terminals *are* available, attenuated by a factor of crystal capacitance divided by external capacitance, or, $C_i/C_e$. If the voltage across the external capacitor 24 alone is amplified by the reciprocal factor $C_e/C_i$ and then added to the voltage across the load resistor 12, the entire spectrum of the original signal is obtained. Since the external capacitor 24 acts like a low-pass, it theoretically provides all frequencies below the cut-off frequency $f_1$ down to DC.

Hence, FIG. 2 illustrates the basic principle of this invention. The low frequency signal components, $V_e(t)$, are measured across the external capacitor 24 attenuated with respect to their presence in the crystal voltage $V_c(t)$. The high frequency signal components, $V_L$, are measured across the load resistance 12, *un*attenuated. The cross-over frequency is the frequency $f_1$, the 3 db point.

FIGS. 1 and 2 depict what may be referred to as the single-ended or unbalanced mode. The voltages $V_e(t)$ and $V_L(t)$ corresponding to low and high frequency components, respectively, are measured on opposite ends of the external capacitor 24 and the load resistor 12, respectively, with reference to ground potential. The crystal itself is ungrounded, or "floating."

As mentioned above, the circuits shown in FIGS. 1 and 2 employ the crystal in a single-ended or unbalanced mode. However, the crystal may also be used in a double-ended or balanced mode. The conventional double-ended or balanced mode is illustrated in FIG. 3 and the improved double-ended or balanced circuit employing the present invention is shown in FIG. 4.

With reference now to FIG. 3, the load resistor 12 of FIG. 1 is conventionally replaced by a pair of load resistors 12' connected in series, with the center connection therebetween being connected with a ground 26. The resistors 12' are each of a resistance of one-half $R_L$, so that the total load impedance to the crystal 14 is the same as in the circuit of FIG. 1. The voltage or signal measurement is made differentially across the load resistors 12', positively or negatively with respect to the ground 26.

As shown in FIG. 4, the circuit of FIG. 3 may be modified in accordance with the present invention by the series connection of a capacitor 24' between each of the resistors 12' and the ground 26, with each of the capacitors 24' having a capacitance of twice $C_e$.

In the improved circuit of FIG. 4, the low frequency signal is available across the capacitors 24', positively or negatively with respect to ground. The low frequency signal available differentially across the capacitors 24' would be attenuated by the factor $C_1/C_e$. The high frequency signal, unattenuated, plus the attenuated low frequency signal is available from the respective terminals 20 and 22, with respect to ground in a similar manner, as shown.

Furthermore, and with reference now to FIG. 5, an additional filter circuit or stage 28 may be utilized to eliminate the low frequency signals entirely from the high frequency signal, enabling separate measurement of the high and low frequency signal components. By way of example, such a filter may comprise a filter capacitor 30 of a capacitance ⅕ the capacitance of the crystal, or ⅕ $C_1$, connected in series with the high frequency output and a filter resistor 32 of a resistance five times the crystal's total load resistance, or, $5R_L$ (i.e. 10 times resistance 12'), connected between capacitor 30 and the ground 26.

In each of the circuits shown, the cross-over frequency between the high and low frequency measurement, or the cut-off frequency of each component, is $f_1 \cong 1/(2\pi R_L C_1)$, provided the external or series capacitors 24 or 24' are much larger than the equivalent capacitance 16 of the piezo-electric crystal 14, i.e., $C_e \gg C_1$. Accordingly, the present invention enables separate measurement and recording of high and low frequency signals produced by a piezo-electric crystal, or measurement and recording of singles over the entire bandwidth thereof and in each case at a low impedance level.

The basic principle of the present invention can be applied whenever it is desired to measure the voltage across a small capacitor, but at a lower impedance level than would be required if the measurement were made directly upon the small capacitor itself. In accordance with the present invention, a much larger capacitor is connected in series with the small capacitor and the voltage then measured across the large capacitor. The signal strength across the large capacitor is only a fraction of that across the small capacitor, this fraction being the ratio of small-to-large capacitor, but the impedance level is also reduced by the same factor. The shape of the voltage waveform across the large capacitor is an exact replica of that across the small capacitor, except for the scale factor of amplitude.

While the invention has been shown, illustrated, described and disclosed in terms of an embodiment or modification which it has assumed in practice, the scope of the invention should not be deemed to be limited by the precise embodiment or modification herein shown, illustrated, described or disclosed, such other embodiments or modifications as may be suggested to those having the benefit of the teachings herein being intended to be reserved especially as they fall within the scope of the claims here appended.

What is claimed is:

1. Apparatus for enabling determination of the voltage across a piezo-electric transducer having a small capacitance comprising a load resistance and a large capacitance connected in series with said transducer, said load resistance comprising a pair of resistances, each resistance of said pair of resistances being connected with an opposite one of the terminations of said transducer, said large capacitance comprising a pair of capacitances, each capacitance of said pair of capacitances being connected in series with one of said resistances and with a ground, so that voltage measurements may be made relative to said ground, and low impedance voltage measurement across said transducer indicating both high and low frequency components of stresses applied thereto and low impedance voltage measurements across said large capacitances indicating only the low frequency components.

2. Apparatus defined in claim 1 further comprising filter means connected across said series connected resistances and capacitances so that measurement of the high frequency voltage components may be made independently of the low frequency voltage components.

3. Method of analyzing vibrations comprising, at least the steps of, converting the vibrations into electrical voltage signals with a piezo-electric transducer device, connecting a series connected large capacitor and load resistor in series with the transducer device, selectively measuring the voltage developed across said load resistor for indicating the magnitude of high frequency vibrations applied to said transducer device and across said large capacitor for indicating the magnitude of low frequency vibrations applied to said device.

References Cited

UNITED STATES PATENTS

| 2,237,298 | 4/1941 | Baumzweiger. |
| 2,615,934 | 10/1952 | Mackta _____ 324—111 |
| 2,412,191 | 12/1946 | Zottu _____ 324—126 X |
| 2,448,581 | 9/1948 | Fair _____ 324—56 |

OTHER REFERENCES

Olson, "Elements of Acoustical Eng.," Van Nostrand, (1947), pp. 318 and 319.

ALFRED E. SMITH, Primary Examiner

U.S. Cl. X.R.
73—67; 324—56